United States Patent
Hoffman et al.

(10) Patent No.: US 6,251,156 B1
(45) Date of Patent: Jun. 26, 2001

(54) METHOD OF PRODUCING MOLTEN IRON IN DUPLEX FURNACES

(75) Inventors: Glenn E. Hoffman, Lancaster, SC (US); Ronald D. Gray, Bethel Park, PA (US)

(73) Assignee: Midrex Technologies, Inc., Charlotte, NC (US)

( * ) Notice: Subject to any disclaimer, the term of this patent is extended or adjusted under 35 U.S.C. 154(b) by 0 days.

(21) Appl. No.: 09/429,973

(22) Filed: Oct. 29, 1999

Related U.S. Application Data

(60) Provisional application No. 60/106,433, filed on Oct. 30, 1998.

(51) Int. Cl.[7] .............................. C21B 13/12; C22B 1/216
(52) U.S. Cl. ......................... 75/10.6; 75/10.63; 75/10.66; 75/484
(58) Field of Search .................................. 75/10.45, 10.6, 75/10.61, 484, 10.66, 584, 10.63

(56) References Cited

U.S. PATENT DOCUMENTS

| | | | | |
|---|---|---|---|---|
| 1,324,458 | * | 12/1919 | McIntosh | 75/584 |
| 4,395,285 | | 7/1983 | Merkert | 75/256 |
| 4,514,218 | * | 4/1985 | Inagaki | 75/10.66 |
| 4,699,654 | * | 10/1987 | Maddever et al. | 75/10.45 |
| 4,701,214 | | 10/1987 | Kaneko et al. | 75/38 |
| 4,731,112 | | 3/1988 | Hoffman | 75/10.22 |
| 5,186,741 | * | 2/1993 | Kotraba | 75/484 |
| 5,641,336 | * | 6/1997 | Roth | 75/414 |
| 5,681,367 | * | 10/1997 | Hunter | 75/10.48 |
| 5,730,775 | | 3/1998 | Meissner | 75/436 |

* cited by examiner

Primary Examiner—Roy King
Assistant Examiner—Tima McGuthry-Banks
(74) Attorney, Agent, or Firm—Dougherty & Clements LLP

(57) ABSTRACT

This invention relates to a method for operation of a rotary hearth furnace in conjunction with an electric melter for production of high purity iron product having a range of silicon and manganese, with low sulfur and phosphorus content. The method includes producing high purity iron product and a range of carbon content product from iron oxide and carbon bearing compacts, including the steps of providing a furnace for direct reduction of iron oxide and carbon bearing compacts, pre-reducing iron and carbon bearing compacts in a furnace having a rotary hearth surface, producing intermediate carbon-containing metallized iron. An electric melter furnace is utilized for receiving intermediate carbon-containing metallized iron from the pre-reducing step, which is fed directly and continuously into a central interior area of the electric melter, with heating of the carbon-containing metallized iron in the electric melter under elevated temperatures of about 1300° C. to about 1700° C., minimizing the ingress of air or other undesirable gases such as oxygen in the melting step while maintaining elevated temperatures, and removing high purity liquid iron product from the electric melter. The method provides a high iron content product having a specified range of carbon, silicon, and manganese percentages, with low sulfur and phosphorus content. There is significant reduction of silicon oxides, and reduction of manganese oxides in the product. An extremely desirable high iron content product is produced for use by the steelmaking industry.

20 Claims, 2 Drawing Sheets

METHOD OF PRODUCING MOLTEN IRON IN DUPLEX FURNACES

CROSS-REFERENCE TO RELATED APPLICATION

This application claims the benefit of U.S. Provisional Application No. 60/106,433, filed on Oct. 30, 1998.

FIELD OF INVENTION

This invention relates to an improved method for the production of molten iron in a continuous duplex furnace operation. More particularly, this invention relates to a method of continuously processing hot direct reduced iron in an electric melting furnace.

BACKGROUND OF THE INVENTION

In 1983, in U.S. Pat. No. 4,395,285, Merkert taught a low density, porous compact of prepared mix containing silica fume, finely-divided carbonaceous reducing agents such as petroleum coke or coal, and optimally with iron and a binder.

In 1987, U.S. Pat. No. 4,701,214, Midrex taught reduction by utilizing off gas generated by a smelting furnace in a rotary hearth furnace. A method of operation was promoted which required less energy and a smaller smelting furnace by introducing gaseous reductants and fuel into the rotary hearth furnace.

In 1987, in U.S. Pat. No. 4,731,112, Hoffman taught a method of making a molten ferroalloy product in a melting furnace from a feed briquette of metallized iron, granulated alloy metal oxide, and a carbonaceous material.

In 1998, in U.S. Pat. No. 5,730,775, Midrex taught an improved method known by the trade name or trademark of FASTMET, and apparatus for producing direct reduced iron from iron oxide and iron bearing and carbon compacts that are layered no more than two layers deep onto a rotary hearth, and are metallized by heating the compacts to temperatures of approximately 1316° to 1427° C., for a short time period. For a general understanding of the recent art, U.S. Pat. No. 5,730,775 is incorporated herein by reference.

All major steelmaking processes require the input of iron bearing materials as process feedstocks. In a steelmaking process utilizing a basic oxygen furnace, the iron bearing feed materials are usually blast furnace hot metal and steel scrap. A broadly used iron source is a product known as Direct Reduced Iron ("DRI") which is produced by the solid state reduction of iron ore or iron oxide to metallized iron without the formation of liquid iron. Metallized in this sense, and throughout this specification, does not mean coated with metal, but means substantially reduced to the metallic state.

Improvements are sought within the industry for furnace modifications and improved methods of operation that provide for efficient, continuous production of high purity iron with a range of carbon content in which iron oxides are efficiently reduced to purified iron in the process while slag components are separated from the purified iron.

Specifically, a high purity iron product with a specified range of carbon content, a specified range of silicon and manganese content, and low sulfur and low phosphorous content is sought by the steelmaking industry. Molten iron product of this quality is typically produced by a blast furnace or conditioned after blast furnace production. Other melters such as conventional electric arc furnaces or submerged arc furnaces produce molten iron having different chemistry, in which the preferred reduced silicon content is not achieved efficiently. The reason that alternative melters cannot meet the industry's chemistry requirements for hot metal is that these furnaces fail to provide the necessary simultaneous conditions of optimum thermodynamic process equilibrium, and rapid melting. The invented method provides the environment as well as the process flexibility such that the desired silicon content in the hot metal can be easily achieved (increased or decreased) by adjusting power input to the electric melter (temperature).

SUMMARY OF THE INVENTION

The invented method continuously feeds material containing iron oxide and carbon compounds into a sequence of hot process steps. The first hot process step employs a rotary hearth furnace, operating below the melting point of the material, which effects pre-reduction of the material. The exit material from the rotary hearth furnace is continuously and preferably hermetically introduced into an electric melter wherein the material is further reduced at temperatures above the melting point of the material. The material exiting the pre-reduction rotary hearth furnace is never exposed to air or cooled between the exit port of the pre-reduction furnace and entry into the electric melter. The invented method produces a high purity iron melt containing a specified percentage of carbon. Starting materials are introduced into the rotary hearth pre-reduction process in layers in the form of compacts (e.g., compressed material). Pre-reduced material from the rotary hearth step is fed continuously and directly into the central interior area of the electric melter. The electric melter is maintained at temperature exceeding the melting point of the material and the ingress of oxygen is minimized to guarantee efficient reduction. High purity iron product is periodically removed from the electric melter.

Utilizing a pre-reduction step of heating iron-bearing compacts in a rotary hearth furnace, then directly and continuously feeding the carbon-containing metallized iron into an electric melter effectuates a very high iron content product having high percentages of carbon. Moreover, melting process conditions are such that the sulfur content is minimized, some $SiO_2$ is reduced to silicon, and some MnO is reduced to manganese in the final product. Therefore, an extremely desirable high iron content product is provided for use by the steelmaking industry.

OBJECTS OF THE INVENTION

The principal object of the present invention is to provide a method of achieving efficient reduction of iron oxide bearing materials at elevated temperatures in a series of furnaces.

Another object of the invention is to provide a method of achieving efficient continuous production of high purity liquid iron having concentrations of about 1% to about 5% carbon at elevated temperatures in a series of furnaces with separation of slag components from the purified liquid iron-carbon end product.

An additional object of the invention is to provide a method of desulfurizing high purity iron and reducing contaminants in direct reduced iron by continuously feeding an electric melter.

The objects of the invention are met by a method for producing highly purified iron and high percentage carbon product from iron oxide bearing materials, comprising the steps of providing a furnace for direct reduction of iron oxide bearing materials containing carbon in the form of compacts, layering the iron oxide and carbon bearing compacts in the furnace, pre-reducing iron oxide and carbon compacts, accomplishing the pre-reducing step in a furnace having a rotary hearth surface, the pre-reducing step producing hot carbon-containing metallized iron, then using an electric melter furnace for receiving hot carbon-containing metallized iron from the pre-reducing step, the second hot process step includes placing said electric melter furnace in close proximity to the rotary hearth furnace. After the rotary hearth furnace step, the hot, solid carbon-containing metallized iron material is used to directly and continuously charge an electric melter. The charge is inserted into the central interior area of the electric melter nearest the molten iron bath/electrode interface, or in other electric melters, inserted into the region of minimum slag, effecting rapid heating of the carbon-containing metallized iron to liquefying temperatures while minimizing the ingress of oxygen to assure optimum reduction conditions. Lastly, high purity iron product from the electric melter is periodically withdrawn without interrupting the continuous operation of the furnaces. The method of utilizing a pre-reduction step of heating carbon-containing iron oxide compacts in a rotary hearth furnace, and directly, continuously and hermetically feeding the hot, solid carbon-containing metallized iron from this furnace into an electric melter provides a high iron content product having high percentages of carbon, with significant desulfurization of the product, significant reduction of silicon oxides to silicon, and reduction of manganese oxide to manganese.

BRIEF DESCRIPTION OF THE DRAWINGS

The foregoing and other objects will become more readily apparent by referring to the following detailed description and the appended drawing in which.

DETAILED DESCRIPTION

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will convey the scope of the invention fully to those skilled in the art. Like numbers refer to like elements throughout.

Figure 1:
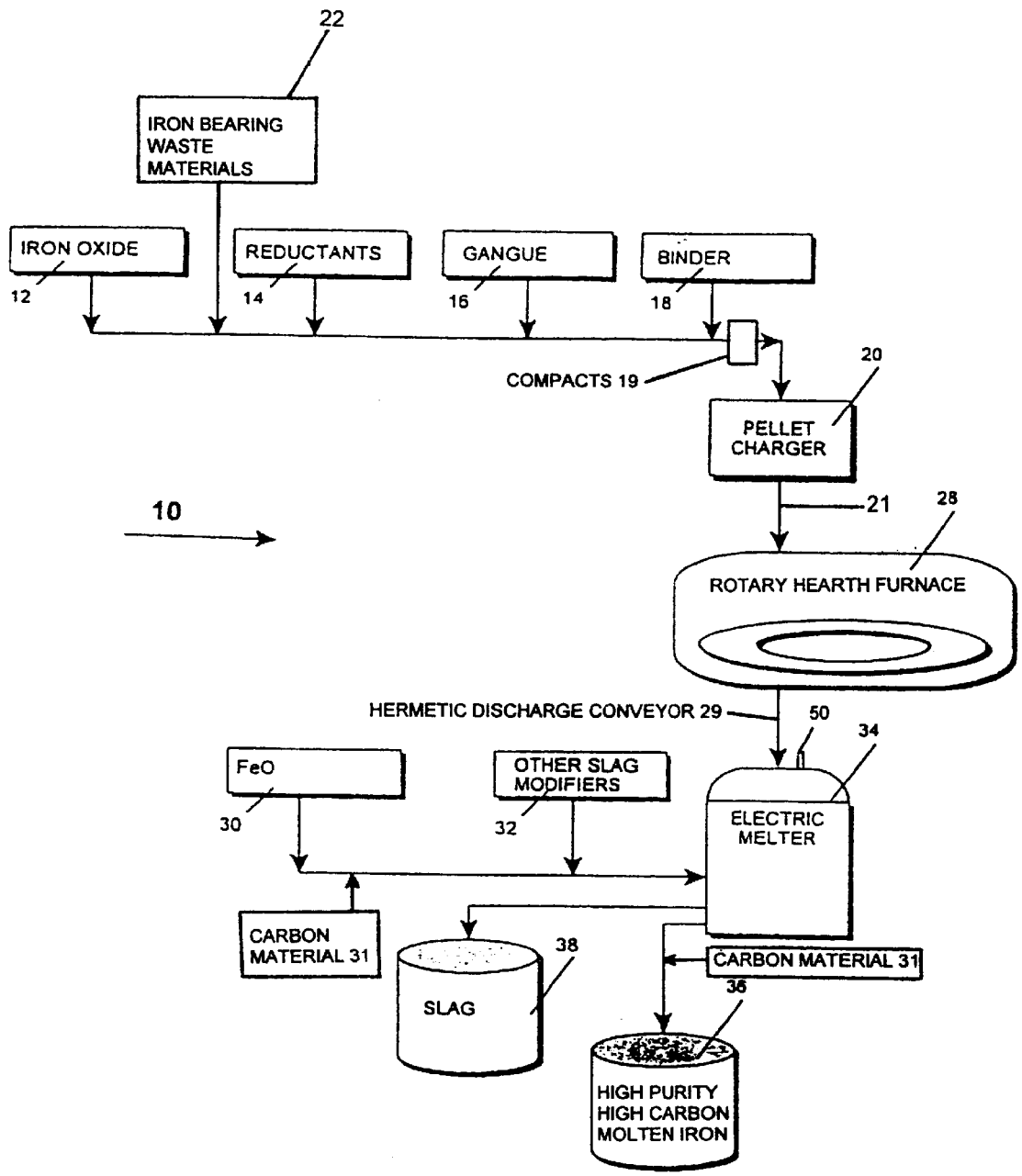
FIG. 1 is a flowchart of the method for producing high purity iron according to this invention.

Referring now to FIG. 1, the overall method 10 uses a first and a second hot process to produce the desired end product. The input materials consist of: iron oxides 12 or iron bearing waste materials such as dust, sludge, mill scale, or combination thereof 22; reductants 14 such as coal powder, coal fines, and other carbonaceous materials; slag formers 16 such as $SiO_2$, CaO, $Al_2O_3$, $CaF_2$ (fluorspar) and/or MgO; and a binder 18. These materials are formed into compacts 19, preferably in the form of uniformly-sized briquettes or pellets. The compacts fill hopper 20 from which they are continuously conveyed to an input port of a rotary hearth furnace 28. The iron oxide bearing compacts are placed in a layer or layers over the hearth surface 42. The hearth rotates, progressing the material through two or more hot zones that effect a reduction of the oxides without the material becoming liquid. The exit material, pre-reduced iron, DRI of this first hot process is 70% to 95% metallized iron at a temperature of approximately 700° C. to approximately 1100° C. The pre-reduced DRI material is conveyed directly, hermetically and continuously via feed leg 29 from the rotary hearth to charge an electric melter 34. The DRI is fed directly and continuously into the central portion of the melter where it is liquified very rapidly (within seconds). The melter further refines the liquid iron material as well. The assay of the final iron material can easily be modified by controlling conditions in the furnace. Slag modifiers 32 or carbon materials 31 may be used as necessary to control the final output material and/or the viscosity of the slag. The melter is periodically tapped to remove a portion of the slag 38 and subsequently, the liquid iron product 36. Carbon materials 31 may be added upon tapping. The steps of the method produce high purity molten iron, with specified carbon and silicon and extremely low sulfur at an exit temperature of about 1300° C. to about 1700° C. within the ranges given in Table 1. The position within each range may be specified.

TABLE 1

| End Product | | |
|---|---|---|
| Fe | 98.8% | 93.4% |
| C | 1.0% | 5.0% |
| Si | 0.2% | 1.5% |
| S | ~0.00% | 0.10% |

The foregoing is a brief overview of the method. The details will now be developed in a discussion of the apparatus used.

Figure 2:
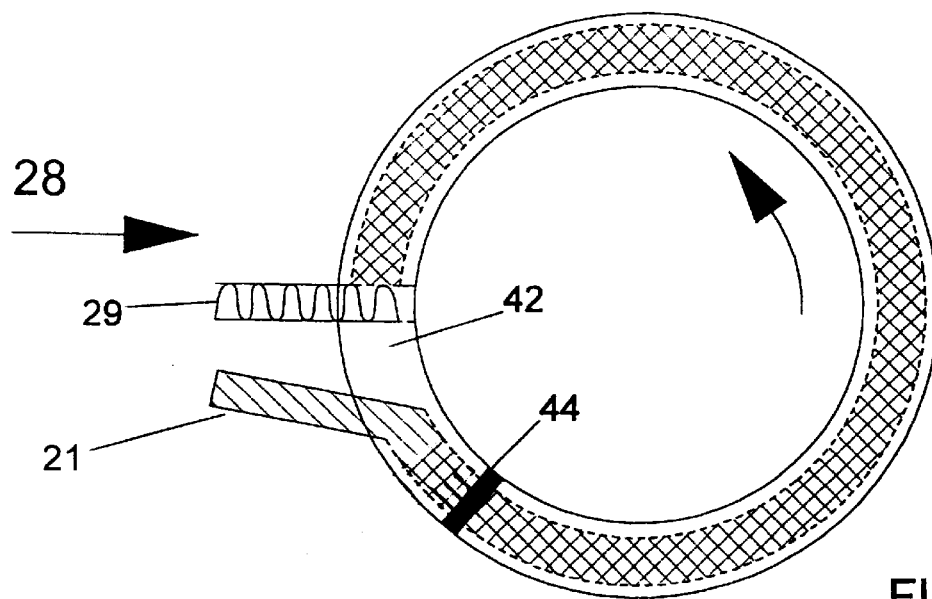
FIG. 2 is a diagrammatic top view of the rotary hearth furnace in accordance with the invention.

Refer to FIG. 2 for the elements of the rotary hearth furnace 28. Heat processing may be accomplished by fixed gas burners, tilting gas burners or other devices for heating a furnace. The input materials from hopper 20 are compacts 19 that consist of iron oxides 12 and/or iron bearing waste materials 22, reductants 14 such as coal powder, coal fines, and other carbonaceous materials; slag formers 16 such as $SiO_2$, CaO, $Al_2O_3$, $CaF_2$ (fluorspar) and/or MgO, and a binder 18. The conveyor 21 may be a vibratory feed conveyor or other standard continuous belt, pneumatic or spiral conveyor of pellet-sized materials. The compacts 19 contain slag formers feed material 16 with CaO and/or MgO additions so that the lime/silica, C/S ratio (% CaO/% $SiO_2$) and/or "V" ratio (% CaO+% MgO)/(%$SiO_2$+% $Al_2O_3$) can be tailored to a specific composition that then influences desulfurization of the bath by the slag generated in the melter. See Table 2.

TABLE 2

| Slag Ratios | | | |
|---|---|---|---|
| Ratio | Definition | Approximate minimum | Approximate maximum |
| C/S | % CaO/% $SiO_2$ | 0.5 | 2.2 |
| V | (% CaO + % MgO)/ (% $SiO_2$ + % $Al_2O_3$) | 0.4 | 1.4 |

The placement of the material within the rotary hearth furnace includes layering of the iron oxide bearing material compacts 19 onto the hearth surface 42 in a single layer (100% loading) or multiple layers (e.g., 200% loading). The loading is accomplished by the rate at which compacts are delivered to the furnace in combination with the height of a leveler 44 above the hearth surface. This procedure lends itself to uniform heating of the compacts and produces uniform chemistry of the DRI product.

The metallized iron material discharged from the rotary hearth furnace 28 of the pre-reducing step includes sulfur, phosphorus and metal oxide compounds from slag formers contained in the iron bearing feed materials, reductant ash. The hot DRI product contains sufficient carbon to accommodate carburization of the hot metal in the electric melter 34 as well as reduction of residual FeO and partial reduction (about 1% to about 99%) of other oxide species such as $SiO_2$, and MnO, plus any excess carbon as required by the process. The temperature of the exit material from the rotary hearth furnace 28 should preferably be in the range of approximately 700° C. to approximately 1100° C. The carbon-containing metallized iron product from the rotary hearth furnace 28 is metallized to approximately 70% to 95% iron content on the hearth surface. The material is conveyed directly, continuously and hermetically to charge an electric melter by feed leg 29 which is a discharge conveyor.

Figure 3:
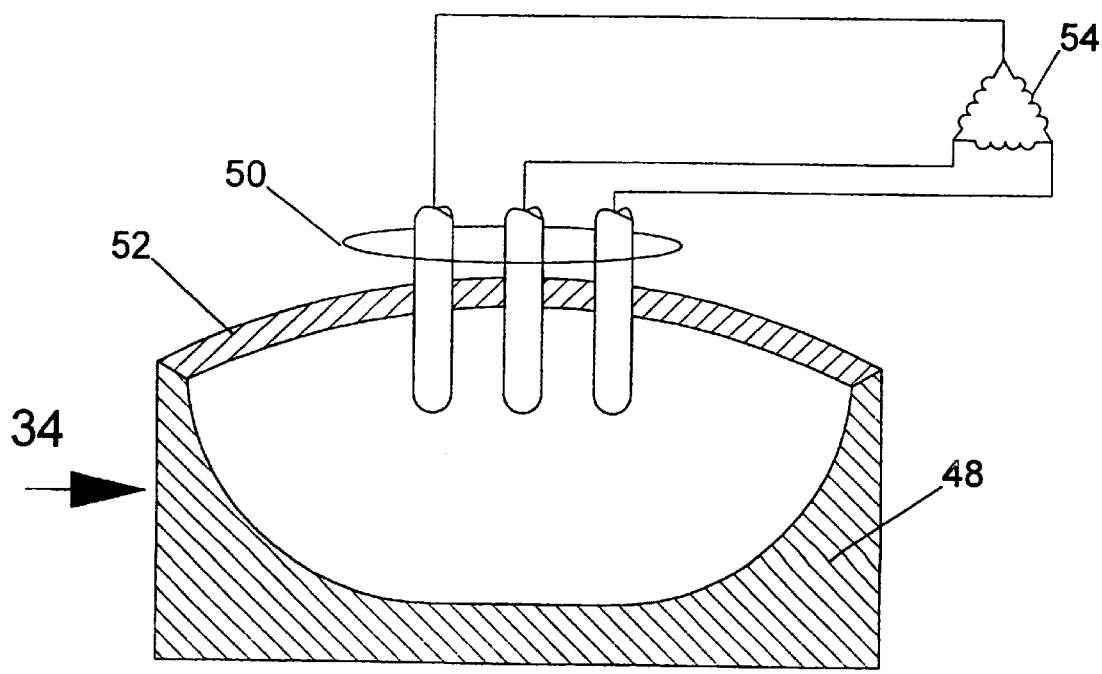
FIG. 3 is a vertical cross-section of a typical electric melter, a 3 phase electric arc furnace, for use with the invention.

Referring to FIG. 3, which is a diagrammatic cross section of a typical electric melter 34. Various types of electric melters can be adapted for this application. There are two basic types, arc types and induction types. Either type may be used. Electric arc types are preferred for use. There are a number of variations in arc furnace designs. The type illustrated here is an electric arc furnace 34 that employs a non-conducting hearth 48 and three phase alternating current (AC) power 54. The furnace is used both for melting and refining the charge. The preferred furnace has an insulating roof 52, penetrated by electrodes 50. The illustrated electrodes are powered by a three-phase power source. Single phase AC and DC types may also be used. The secondary of the transformer that drives the electrodes 50 illustrates the fact that the power input, and therefore the temperature, is readily adjustable.

As part of the feeding step, hot DRI is directly charged to the electric arc melter 34, and directed preferably toward the center of the melter, near the region of arcing between the electrodes and molten iron bath. Additional iron oxide 30, carbon compounds 31 and slag modifiers 32, including lime, silicates, and fluxing agents may be added to the electric arc melter, as necessary, to augment the composition of the hot DRI discharged from the rotary hearth furnace 28. Melting of DRI compacts occurs in mere seconds after being charged into the electric arc melter 34.

For the electric melter heating step, use of pre-baked carbon or graphite electrodes is preferred to Soderburg (self-baking) type electrodes. This simplifies operation, reduces capital expense and improves electrical efficiency. Maintaining atmospheric integrity includes eliminating or minimizing the ingress of air and other undesirable gases into the melter. Minimization of air ingress prevents reoxidation of reduced iron, molten iron and any other reduced species or alloyed species in the molten iron. For the electric arc melter, a special seal having purge gas capability may be utilized around the electrode delta or other electrode configuration where the electrodes 50 penetrate the melter through the roof 52.

Since an electric melter is not dependent on combustion of fuels with air or oxygen enriched air, or post combustion of evolved combustibles from the molten iron bath with air, oxygen enriched air or oxygen, the reducing atmosphere is readily maintained. For example, some hybrid smelting reduction processes rely on the post-combustion of evolved CO and $H_2$ gases from a molten iron bath gasifier for energy input to process preheated iron ore and/or pre-reduced iron oxide bearing materials. In fact, combustion-based melting or smelting processes may produce combustion products which are in equilibrium with the molten iron, or favor reduction of iron oxide bearing materials, but still be oxidizing to other reduced or alloyed species which are desirable components in the molten iron, e.g., species such as Si and Mn. In the invented method of operation, the electric melter 34 has a distinct advantage over the combustion-based melters and/or smelters.

As part of the heating step within the electric melter, a low density slag condition is maintained within the electric melter as a key process consideration because the low density slag promotes easy penetration of hot DRI compacts into the electric melt zone. Furthermore, low density slag rapidly imparts a high heat transfer to the DRI, which improves the DRI melting rate within the electric melter. The low density slag condition is created by reacting the small quantity of residual FeO contained in the DRI with the carbon in solution within the molten iron bath, or with carbon contained in the slag phase of the feed material, liberating carbon monoxide, CO, which causes the foaming of the slag. The extent of foaming of the slag within the electric melter depends on the metallization of the incoming DRI. A greater degree of foaming of the slag occurs when the incoming DRI is not too highly metallized, i.e., the iron metallization level of the material is below 90% imparting a higher transfer of heat to the direct reduced iron. If the incoming DRI is highly metallized, i.e., iron metallization levels greater than 90%, a lesser degree of foaming of the slag will occur, imparting a lower transfer of heat to the DRI. Since controlled foaming of slag within the electric melter is desirable, the optimal condition for the electric melter is to provide hot DRI compacts from the rotary hearth furnace which are in the range of iron metallization of 70% to 92%, but preferably in the range of 80% to 90%. This condition is preferred despite the fact that using higher metallization DRI requires less electrical energy for processing in the electric melter than lower metallization DRI.

As a benefit of the pre-reducing step, and the subsequent use of an electric melter furnace, the $SiO_2$ and MnO contained in the hot DRI compacts directly fed to the melter are subjected to a melting environment in the electric melter 34 that may be manipulated to be conducive to reduction of $SiO_2$ and/or SiO to [Si] (silicon contained in molten iron), and reduction of MnO to [Mn] (Mn contained in molten iron) which becomes easily assimilated into the molten iron. The degree of silicon oxide and manganese oxide reduction is easily controlled by bath temperature, i.e., the higher the temperature, the higher the extent of silicon oxide or manganese oxide reduction, and the greater the rate of silicon and manganese pick-up in the liquid iron bath. The electric melter bath temperatures can be controlled by varying the power input to the melter via the electrodes. Another alternative is the addition into the electric melter of iron oxide 30, silicon oxides, aluminum oxides, and other slag conditioning materials 32.

Optimal electric melter operation for desulfurization of the hot DRI compacts is accomplished by high temperatures and the basic components (CaO and MgO) contained in the DRI compacts. As the $SiO_2$ contained in the DRI compacts is reduced to Si, the effective lime to silica ($CaO/SiO_2$) ratio in the slag increases, which in turn increases the desulfurization potential of the slag. This phenomenon, combined with a low FeO content slag allows the electric melter 34 to produce liquid iron with extremely low sulphur content. Slag/hot metal sulfur partition ratio, K, has been observed to range from about 50 to about 150.

$K=(S)/[S]$ where (S) is the concentration of sulphur in the slag phase and [S] is the concentration of sulphur in the metal phase. This fortuitous process condition results in observed hot metal sulfur levels to range from about 0.01 to about 0.016% at furnace tap temperatures of about 1450° C. to about 1550° C. Even lower hot metal sulfur levels can be achieved at higher tap temperatures, i.e., % S ranging from about 0.005% to about 0.009% at furnace tap temperatures ranging from about 1550° C. to about 1630° C.

The electric melter 34 should maintain a large molten iron heel of about 1 to about 4 times the tapped metal quantity. The optimal temperature for normal operations of the electric melter for reducing silicon oxides is the temperature range of approximately 1450° C. to approximately 1550° C. at the tap. The furnace is tapped periodically for both hot metal and slag without interrupting the continuous charging and melting operations. The tapholes are then resealed using methods known in the art.

The optimum operation of the electric melter 34 requires minimizing the ingress of oxygen while maintaining the temperatures outlined above. The output 36 of the improved method 10 is high purity iron having a desirably low, specified maximum sulphur content and and silicon content, and a desirably high specified carbon content. Slag 38, having low concentrations of iron, is separated within the electric melter 34 and removed separately from the high purity iron product 36. Low sulphur content iron having the above described characteristics including a high carbon content is extremely desirable to steelmakers because normal desulfurization in the steelmaking vessel is either minimized or unnecessary. The above described method of operation leads to both increased productivity of higher purity iron product and lower operating costs in the steelmaking industry.

SUMMARY OF THE ACHIEVEMENT OF THE OBJECTS OF THE INVENTION

From the foregoing, it is readily apparent that we have invented a method that achieves efficient reduction of iron oxide bearing materials at elevated temperatures in a series of furnaces, efficient continuous production of high purity liquid iron having concentrations of carbon of about 1% to about 5% at elevated temperatures with separation of slag components from the purified liquid iron-carbon end product, and desulfurizing high purity iron and reducing contaminants in direct reduced iron by continuously feeding an electric melter.

The invention has been described in detail, with reference to certain preferred embodiments, in order to enable the reader to practice the invention without undue experimentation. It is to be understood that the foregoing description and specific embodiments are merely illustrative of modes of the invention and the principles thereof, and that various modifications and additions may be made to the apparatus by those skilled in the art, without departing from the spirit and scope of the appended claims.

What is claimed is:

1. A method for producing a high purity high carbon molten iron product from iron and carbon bearing material, said high purity high carbon molten iron product containing from about 1.0% to about 5.0% carbon, said method comprising the steps of:
   (a) forming compacts consisting of iron bearing, carbon containing materials, silicon oxide, manganese oxide and sulfur;
   (b) charging carbon containing materials and the compacts from said forming step into a rotary hearth furnace;
   (c) pre-reducing the compacts in the rotary hearth furnace by heating the compacts to form pre-reduced high carbon hot metallized iron compacts;
   (d) discharging the pre-reduced high carbon hot metallized iron compacts from the rotary hearth furnace at a temperature of about 700° C. to about 1100° C.;
   (e) continuously introducing the pre-reduced high carbon hot metallized iron compacts directly from the rotary hearth furnace into an electric melter;
   (f) heating and melting the pre-reduced high carbon hot metallized iron compacts in the electric melter at a temperature of about 1300° C. to about 1700° C. to form high carbon molten iron;
   (g) preventing oxidation of the high carbon molten iron via minimization of the ingress of oxygen containing gas in said heating step;
   (h) carburizing the high carbon molten iron to form high carbon molten metallized iron;
   (i) purifying the high carbon molten metallized iron by reducing silicon oxides to silicon, reducing manganese oxide to manganese and desulfurizing the high carbon molten metallized iron to produce high purity high carbon molten iron product;
   (j) discharging high purity high carbon molten iron product from the electric melter; and
   (k) maintaining a minimum high purity high carbon liquid iron heel of about 1 to about 4 times the quantity of the intermittently tapped high purity high carbon molten iron product.

2. The method of claim 1, wherein said pre-reducing step is carried out in the rotary hearth furnace having a rotatable hearth surface, and the compacts are placed on the rotatable hearth surface.

3. The method of claim 2, further comprising loading the compacts evenly in a plurality of layers on the rotatable hearth surface.

4. The method of claim 1, wherein said heating and melting step is carried out with electrodes of pre-baked material, the pre-baked material selected from the group consisting of carbon and graphite.

5. The method of claim 1, further comprising maintaining a foaming slag during said heating and melting step.

6. The method of claim 1, further comprising maintaining a reducing environment within the electric melter.

7. The method of claim 6, further comprising establishing an inert gas purge within the electric melter.

8. The method of claim 7, wherein the inert gas purge within the electric melter is nitrogen gas purge.

9. The method of claim 1, further comprising maintaining a temperature of about 1450° C. to about 1700° C. within the electric melter.

10. The method of claim 9, further comprising maintaining a temperature of about 1450° C. to about 1550° C. within the electric melter for optimal reduction of silicon oxide to silicon and manganese oxide to manganese in the high carbon molten metallized iron.

11. The method of claim 9, further comprising maintaining a temperature of about 1550° C. to about 1630° C. within the electric melter to enhance slag fluidity.

12. The method of claim 9, further comprising maintaining a temperature of about 1550° C. to about 1630° C. within the electric melter to enhance sulfur removal from the high carbon molten metallized iron.

13. The method of claim 1, wherein the compacts are formed with reductants, therein, the reductants being selected from the group consisting of coal powder, coal fines, graphite, ash, petroleum coke, and other carbonaceous compounds.

14. The method of claim 1, wherein the iron bearing materials and the carbon containing materials are formed from materials selected from the group consisting of iron bearing waste material, steel mill sludge, mill scale, dust, iron oxides, silicon oxide compounds, sand, taconite, manganese oxide compounds, magnesium oxide compounds, aluminum oxide compounds, and a binder.

15. The method of claim 1, wherein the high purity high carbon molten iron product has sulfur levels from about 0.005% to about 0.016%.

16. The method of claim 1, wherein the high purity high carbon molten iron product contains at least about 95% reduced iron.

17. The method of claim 1, wherein said continuously introducing step further comprises adding carbon containing compounds into the electric melter.

18. The method of claim 1, wherein said continuously introducing step further comprises adding slag conditioning materials into the electric melter.

19. The method of claim 1, wherein said discharging step further comprises adding carbon containing compounds into the high purity high carbon molten iron product.

20. The method of claim 1, further comprising maintaining a low density slag in the electric melter.

* * * * *